United States Patent [19]
Christensen

[11] Patent Number: 5,896,943
[45] Date of Patent: *Apr. 27, 1999

[54] HYDRAULIC CONTROL SYSTEM FOR WORK VEHICLES

[75] Inventor: Carsten Christensen, Broager, Denmark

[73] Assignee: Danfoss A/S, Nordborg, Denmark

[ * ] Notice: This patent issued on a continued prosecution application filed under 37 CFR 1.53(d), and is subject to the twenty year patent term provisions of 35 U.S.C. 154(a)(2).

[21] Appl. No.: 08/696,977

[22] PCT Filed: Feb. 17, 1995

[86] PCT No.: PCT/DK95/00067

§ 371 Date: Oct. 23, 1996

§ 102(e) Date: Oct. 23, 1996

[87] PCT Pub. No.: WO95/23085

PCT Pub. Date: Aug. 31, 1995

[30] Foreign Application Priority Data

Feb. 25, 1994 [DK] Denmark .................................. 0232/94

[51] Int. Cl.[6] ..................................................... F15B 11/16
[52] U.S. Cl. ............................ 180/442; 180/441; 91/516; 60/422
[58] Field of Search ......................... 91/516, 446; 60/422; 180/417, 441, 422, 442

[56] References Cited

U.S. PATENT DOCUMENTS

| | | | |
|---|---|---|---|
| 4,453,451 | 6/1984 | Streeter et al. | 91/28 |
| 4,470,260 | 9/1984 | Miller et al. | 60/422 |
| 4,485,623 | 12/1984 | Chichester et al. | 60/422 |
| 4,548,239 | 10/1985 | Eskildsen | 91/446 X |
| 4,663,936 | 5/1987 | Morgan | 60/422 |
| 4,966,066 | 10/1990 | Kauss et al. | 91/516 |
| 5,479,845 | 1/1996 | Kawamura et al. | 91/514 |

*Primary Examiner*—J J Swann
*Assistant Examiner*—Avraham H. Lerner
*Attorney, Agent, or Firm*—Lee, Mann, Smith, McWilliams, Sweeney & Ohlson

[57] ABSTRACT

A hydraulic control system for work vehicles including a control unit to control the steering wheels of a vehicle via a cylinder and a priority valve which by a first load-sensing system controls the pressure fluid flow to the control unit and to a subsequent proportional valve group. By a second load-sensing system the proportional valve group controls the pressure fluid flow to secondary hydraulic motors or work cylinders to control the work tools of the vehicle. The control system also includes an open-centre valve connection and a fixed displacement pump. The first load-sensing system is connected with a second load-sensing system, whereby drop-off of the pressure fluid flow to the control unit is avoided at simultaneous operation of the latter and of one or several of the proportional valves as is the case with known control systems. Hereby a control system is provided which is particularly agreeable to operate for the driver of the work vehicle.

6 Claims, 2 Drawing Sheets

HYDRAULIC CONTROL SYSTEM FOR WORK VEHICLES

BACKGROUND OF THE INVENTION

The present invention relates to a hydraulic control system for work vehicles, including a control unit connected to a first hydraulic work machine for controlling the steering wheels of the vehicle, a primary priority valve which by means of a first load-sensing system controls the pressure fluid flow to the control unit and the pressure fluid flow to at least one subsequent proportional valve, which by means of a second load-sensing system controls the pressure fluid flow to a connected secondary hydraulic work machine for controlling one of the work tools of the vehicle, and an open-centre valve connection to a tank and a fixed displacement pump.

Hydraulic control systems of this type are very widely used. These control systems are installed particularly in work vehicles like fork-lift trucks, tractors, agricultural, forestry and contractors's machines.

The control unit is provided with a steering wheel with which the driver of the work vehicle directly actuates the control unit mechanically when he wishes to change the movement of the work vehicle. By means of one or several control levers the driver can actuate the proportional valves of the system, thereby controlling the work tools of the vehicle when required. The transfer of signals from the control levers to the proportional valves may be mechanical, hydraulic, or electrical. The primary priority valve is designed to give the highest priority to the pressure fluid flow to the control unit. When the wheel is turned, the pressure fluid flow is divided in the priority valve, so that a sufficient flow of pressure fluid is continuously led to the control unit via the CF (control flow) port of the priority valve. The remaining flow of pressure fluid from the pump is available to the proportional valves via the EF (excess flow) port of the priority valve.

When neither the steering wheel nor the control levers to the proportional valves are actuated by the driver, the priority valve will be in a non-priority position, and the pressure fluid flow from the pump will flow to the tank via the open-centre valve connection. When the control unit is actuated via the steering wheel, the priority valve will control the distribution of pressure fluid via the first load-sensing system, so that as the main rule the control unit will always receive a sufficient flow of pressure fluid depending on the actual steering speed imparted by the driver through the wheel.

One problem of the hydraulic control systems of the type mentioned in the introduction is the fact, however, that the pressure fluid flow to the control unit ceases briefly at certain activation conditions when the control unit and one or several of the work tools of the work machine are operated simultaneously during the operation of the work vehicle, which will be explained in more detail in the following:

If one of the proportional valves is actuated via a control lever simultaneously with the wheel being turned to one extreme position, the load-sensing system of the relevant proportional valve will cause the open-centre valve connection to throttle down the tank connection, so that a pressure fluid flow can be led to the proportional valve being actuated. Hereby the pressure on the EF port of the priority valve will adjust to the pressure required by the proportional valve. It may be a case of the pressure at the CF port at the priority valve being much lower, depending on the pressure being required by the control unit from the pressure fluid flow supplied.

When the operation with the relevant work tool is finished, and the proportional valve is put in neutral position via the control lever, the pressure in the load-sensing system of the proportional valve will be relieved to the tank, whereby the open-centre valve connection will relieve immediately and open to the tank. Hereby the pressure on the EF port of the priority valve will drop off. Because the priority valve must react as a consequence of the opening to the tank of the open-centre valve, a time delay will occur, and a temporary "short circuit" will occur across the priority valve until it has had time to react. The "short-circuit" will cause the pump pressure and thereby the pressure at the CF port of the priority valve to drop off briefly (milliseconds). When the pressure at the CF port drops off, the control unit receives no pressure fluid flow, with the result that the wheel will stop briefly in its activation movement as a consequence of a moment peak. The driver of the work vehicle will feel this as a brief beat in the wheel, which is very annoying to the driver.

During operation of the work vehicles mentioned in the introduction with the hydraulic control system in question, many times during a work day the driver will actuate one or several of the work tools of the vehicle while at the same time operating the steering unit. The vehicle moves, and the driver wishes to change the path of the work vehicle. It may be a fork-lift truck, for instance, moving in a store, where the driver turns the wheel of the truck while at the same time activating a proportional valve controlling a hydraulic motor, which via a chain drive raises or lowers a load on the fork of the truck. When the load of the truck has been placed at the required height above the ground, the driver places the proportional valve in neutral position, whereby a brief beat will occur in the wheel, which will be particularly annoying to the driver.

For a number of years it has been attempted to redress the described problem, for instance by adapting the pressure build-up of the priority valve to the control system in question, but this has not at all been enough to remedy the problem.

SUMMARY OF THE INVENTION

The hydraulic control system according to the present invention is characterised in that the first load-sensing system is connected to the second load-sensing system. Hereby the previously mentioned beats in the wheel are avoided, when one of the proportional valves is put in neutral position after activation of one of the work tools.

Hereby the priority valve must react only to a change corresponding to the difference between the pressure in the first load-sensing system and the second load-sensing system. Therefore the priority valve must travel shorter than in the previously known control system, which results in a considerably quicker reaction of the priority valve, which therefore ensures correct supply of pressure fluid to the steering unit, thus avoiding the beats in the wheel mentioned.

By putting the proportional valve in neutral position, the pressure in the second load-sensing system will be relieved to tank, whereafter the pressure in the first load-sensing system of the steering unit will take over. Consequently, the open-centre valve connection will not relieve and open up to the tank, as in the case of previously known hydraulic control systems, but will adapt to the same pressure level as in the first load-sensing system. The pressure at the open-centre valve connection will be transmitted to the EF port of the priority valve and further on to the P port of that valve, to which port the pump is connected in such a manner that the pressure mentioned is immediately available also at the CF port of the priority valve. Therefore the valve must react only to the previously mentioned pressure difference between the pressure in the first load-sensing system and the second load-sensing system.

The hydraulic control system includes an especially compact module group, in which both the first and the second load sensing systems are integrated.

When it is desirable to give the pressure fluid flow to a predetermined proportional valve a first secondary priority after the pressure fluid flow to the control unit, at least one module including a secondary priority valve is inserted in the proportional valve group.

BRIEF DESCRIPTION OF THE DRAWINGS

The present invention is described in the following with reference to specially preferred embodiments and the drawing, where.

DESCRIPTION OF THE PREFERRED EMBODIMENTS

Figure 1:
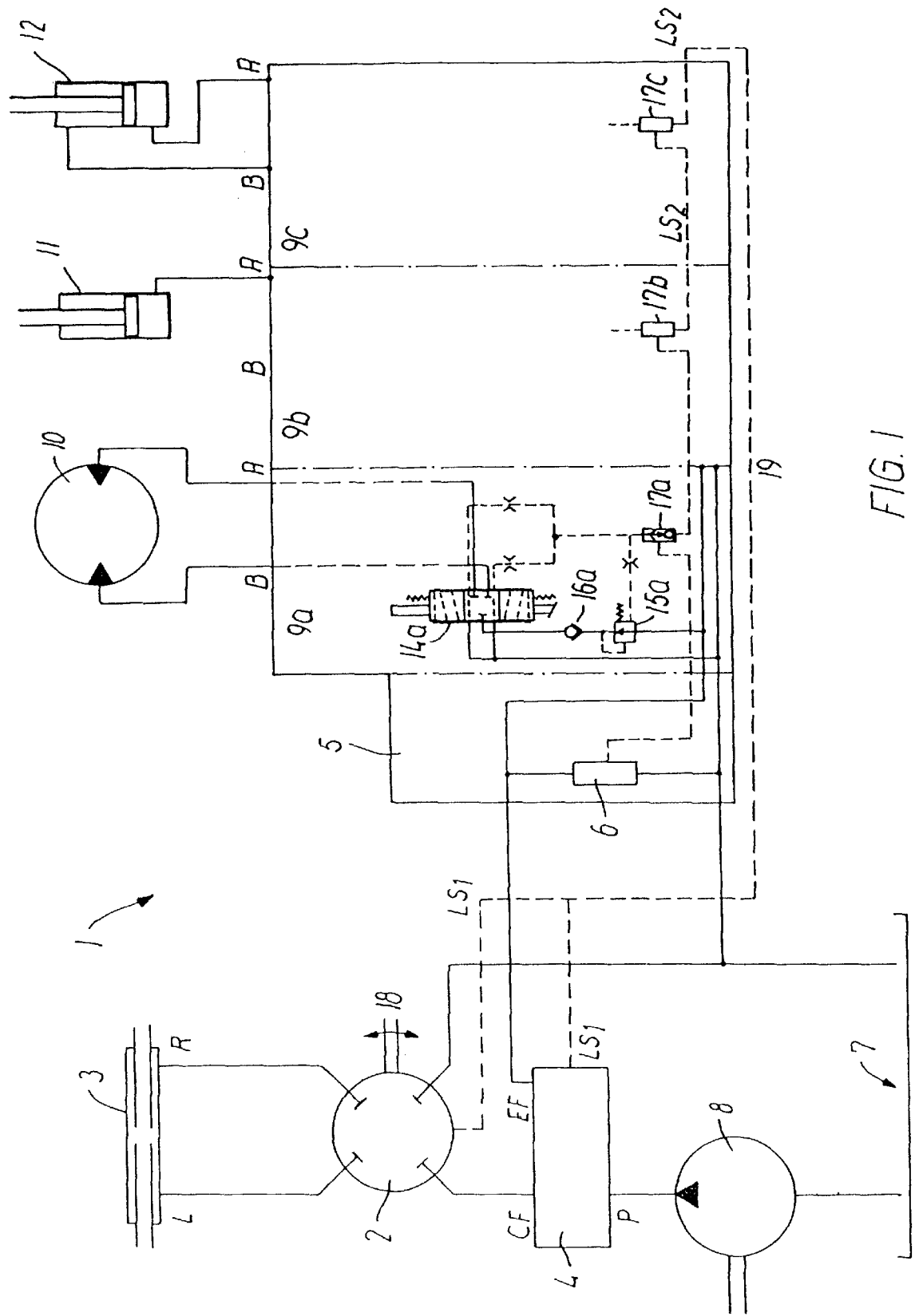
FIG. 1 shows schematically a first embodiment of the hydraulic control system, and FIG. 2 schematically another embodiment of the control system.

In the control system shown schematically in FIG. 1, several of the input valves are drawn schematically with a view to simplifying and facilitating the understanding of the control system design. Thus only the parts of the valves required for understanding the invention are shown.

The control system 1 shown in FIG. 1 includes a control unit 2 connected to a first hydraulic work machine such as a hydraulic cylinder 3 for control of the steering wheels of the vehicle (not shown). The control system 1 further includes a priority valve 4, which includes a CF port through which the pressure fluid flow (control flow) to the control unit 2 is supplied, and an EF port through which the pressure fluid flow (excess flow) is supplied to an open-centre pump side module 5.

The pump side module 5 includes an open-centre valve connection 6 to a tank 7. The control system also includes a fixed displacement pump 8, which supplies a pressure fluid flow to the P port of the priority valve 4.

In the embodiment shown, the hydraulic control system 1 also comprises three proportional valves 9a, 9b, 9c, which are designed as separate modules combined in a proportional valve group. The proportional valve group 9a–9c is mounted with the pump side module 5.

To each of the ports a, respectively b, of the proportional valves 9a, 9b, 9c, a secondary hydraulic work machine may be connected. Thus to the proportional valve 9a a hydraulic motor 10 is connected, which drives for instance the chain drive for height adjustment of the load forks of a fork lift truck. To other proportional valves 9b, 9c may be connected hydraulic cylinders 11, 12, which in the case of the fork lift truck control the angle to horizontal of the load forks.

In the control system according to the present invention, all known types of proportional valves 9a–9c may be used, and therefore only the input parts of the proportional valve 9a are shown in full, with the reservation that parts of the pipe system have been omitted which are not required for understanding the invention. Thus the proportional valve 9a includes a main valve 14a, which determines magnitude and direction of the pressure fluid flow to the motor 10, a pressure compensator valve 15a, which compensates for variations in load and system pressure, thereby keeping the pressure drop across the main valve 14a constant, a non-return valve 16, which prevents the oil from unintentionally running back from the motor 10, and a 2-way valve 17a, which ensures that the system pressure is always controlled by the pressure in the highest loaded valve section.

The mode of operation of the hydraulic control system according to the present invention is explained in detail in the following with reference to the example, where the control system is mounted in a fork lift truck.

The control unit 2 is provided with a steering wheel connected at 18, and when the fork lift truck driver turns the wheel, the pressure fluid flow is divided in the priority valve 4 so that a sufficient pressure fluid flow is continuously fed to the control unit 2 via the CF port. The remaining pressure fluid flow from the pump is available to the pump side module 5 of the proportional valve group 9a–9c via the EF port of the priority valve 4. The distribution of the pressure fluid is regulated by a first load sensing system LS1 so that the pressure fluid flow to the control unit 2 is always determined by the actual control velocity resulting from the actuation of the steering wheel by the driver.

In the embodiment shown, the proportional valve group 9a–9c includes a common, second load-sensing system LS2, which mutually connects the 2-way valves 17a–17c of the proportional valves with the valve 6 in the open-centre pump side module 5.

According to the present invention the first load-sensing system LS1 is connected with the second load-sensing system LS2 via the conduit 19.

By turning the steering wheel and thereby operating the control unit 2 the pressure in the first load-sensing system LS1 will influence the priority valve 4 to the effect that, as mentioned, the control unit 2 is supplied with the required pressure fluid flow. At the same time the pressure in the second load-sensing system LS2 will influence the 2-way valves 17a–17c in the proportional valve group 9a–9c so that the valve 6 in the pump side module 5 adapts to the same pressure, which may be for instance 90 bar.

At simultaneous operation of one or several of the proportional valves such as the proportional valve 9a, the valve will require supply of a pressure of for instance 200 bar, which will thereby be adapted to the second load-sensing system LS2.

Thereby the 2-way valve 17a will change position so that the 90 bar pressure from the first load-sensing system LS1 is disconnected, and the valve 6 will then throttle to the required 200 bar. The 200 bar pressure will be transmitted through the EF port of the priority valve 4 to the pump 8. Thus the pressure at the CF port of the priority valve 4 will be influenced very briefly by the pressure rise at the P port of the pump, and the priority valve 4 will then throttle until the pressure at the CF port corresponds again to the pressure in the first load-sensing system LS1. The priority valve 4 travels sufficiently to ensure that the control unit 2 is continuously supplied with the correct pressure fluid flow, and it is therefore a matter of a so-called pressure compensation.

When the proportional valve 9a is subsequently set in a neutral position, for instance when the driver sets the valve control lever at neutral after the motor 10 has lifted or lowered the load forks of the fork lift truck to the required height while driving, the pressure in the second load-sensing system LS2 will be relieved to tank 7. The 2-way valve 17a in the proportional valve 9a will then change position again so that the pressure in the first load-sensing system LS1 of the control unit will be induced in the second load-sensing system LS2 via the conduit 19. This causes the valve 6 to adjust to the 90 bar, which will be transmitted to the EF port of the priority valve 2 so that the 90 bar pressure is immediately available to the control unit 2.

Thus the priority valve 4 must react to a change from 200 bar to 90 bar only, which allows the priority valve to travel shorter as seen in relation to its travel in known systems, which results in quicker reaction of the priority valve, which again ensures a correct pressure fluid flow to the control unit 2. This prevents the annoying brief pressure drop-off at the CF port, and thereby drop-off of the pressure fluid supply to the control unit, as it is the case in the known hydraulic control systems, and which caused the "beats" of the steering wheel that were so very unpleasant for the driver. Surprisingly it has proved that the hydraulic control system according to the present invention always ensures the required pressure fluid supply to the control unit at simultaneous actuation of the control unit and placing in neutral of the proportional valves actuated. This ensures the work vehicle driver a much more pleasant operation of the control unit when driving.

Figure 2:
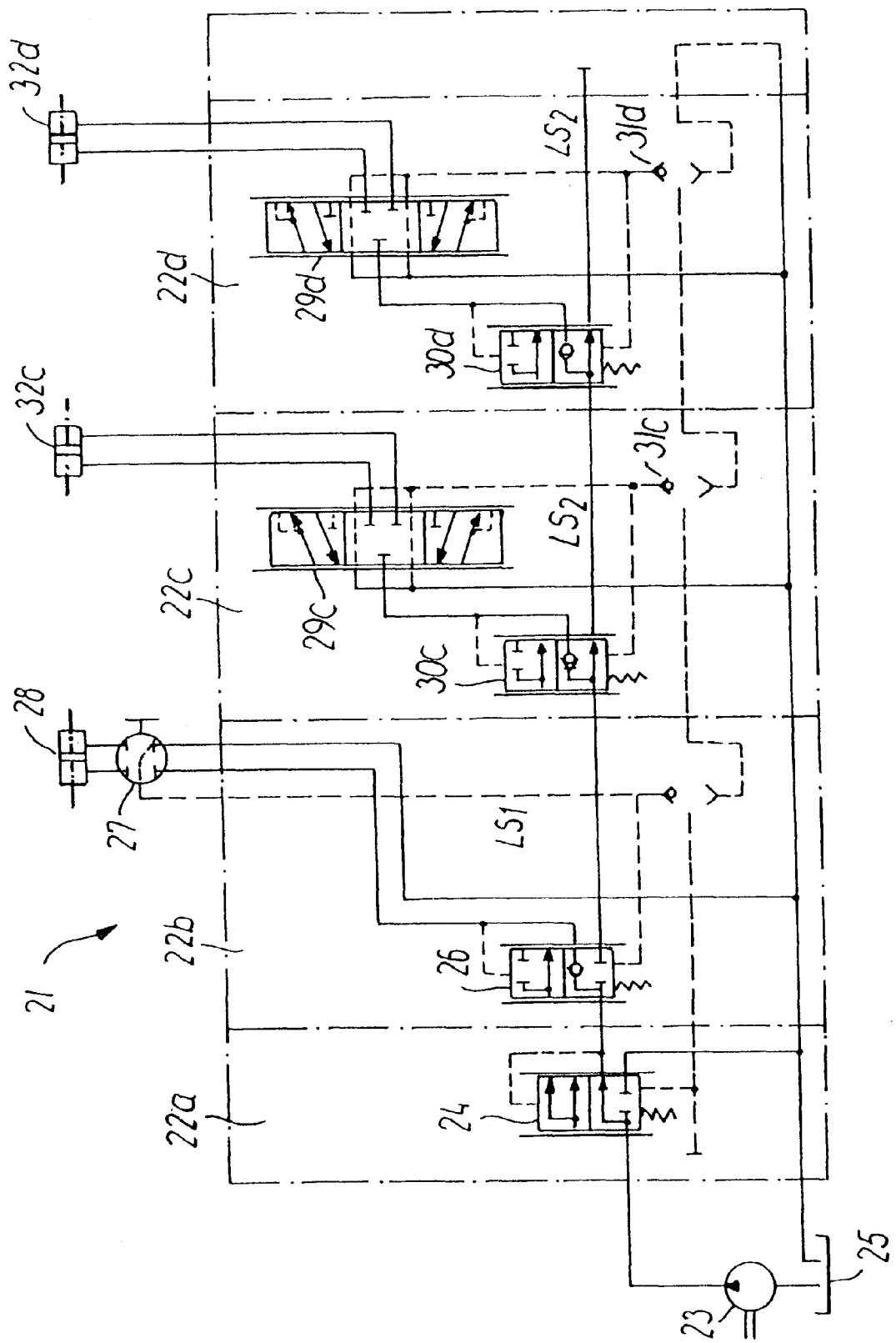

In FIG. 2 is shown a particularly suitable embodiment of a hydraulic control system 21 according to the present invention, where the priority valve is built into a module being part of a module group. The module group includes an open-centre pump side module 22a, a subsequent priority module 22b for the control unit, and subsequent proportional valve modules 22c and 22d for secondary hydraulic work motors or cylinders.

The pump side module 22a is connected with the fixed-displacement pump 23 and includes a valve connection 24 to tank 25. The priority module 22b includes a priority valve 26, which by means of a first load-sensing system LS1 controls the pressure fluid supply to a control unit 27 and a hydraulic cylinder 28 for control of the steering wheels of the vehicle. In the embodiment shown, each proportional valve module 22c, 22d includes a main valve 29c, 29d, a combined pressure compensator and non-return valve 30c, 30d, and a 2-way valve 31c, 31d in a common second load-sensing system LS2. The proportional valve modules 22c, 22d may be connected to hydraulic cylinders 32c, 32d for operation of work tools on the work vehicle.

In the hydraulic control system 21 the load-sensing systems LS1 and LS2 are directly connected at the transitions between the adjacent modules 22a–22d. The module group 22a–d is particularly simple and easy to produce and at the same time simple and quick to mount in a work vehicle.

In the module design described, high flexibility is achieved at the same time, because it is easy to replace or move a module, for instance if it is desirable to place one more proportional valve module in the group for control of one more tool. At the same time it will be possible to place extra priority valve modules in the module group, if a previously determined priority sequence is required for the pressure fluid flow to the proportional valve modules. A priority valve module inserted between the priority valve module 22b and the proportional valve module 22c will ensure that the pressure fluid flow to the proportional valve module 22c receives the first secondary priority after the pressure fluid flow to the control unit 27.

The invention is described with reference to particularly preferred embodiments. Many changes may be made, however, without deviating from the very principle of the invention. Thus the input valves of the control system may be designed and combined into modules in many different ways as long as the first and second load-sensing systems are connected.

I claim:

1. A hydraulic control system for a work vehicle, including a control unit connected to a first hydraulic work machine for controlling steering wheels of the vehicle, a primary priority valve having a first load-sensing system, said first load-sensing system having means to control pressure fluid flow to the control unit and pressure fluid flow to at least one subsequent proportional valve, and including a second load-sensing system having means to control pressure fluid flow to a connected secondary hydraulic work machine for controlling a work tool of the vehicle, and including an open-center valve connection to a tank and a fixed displacement pump, the first load-sensing system being connected to the second load-sensing system for joint operation of the primary priority valve.

2. A hydraulic control system according to claim 1, in which all the load sensing systems of the subsequent proportional valves are connected to form a common, second load-sensing system.

3. A hydraulic control system according to claim 1, in which the proportional valves are located in separate modules, which are combined into a proportional valve group.

4. A hydraulic control system according to claim 3, in which the proportional valve group is combined with an open-centre pump side module.

5. A hydraulic control system according to claim 4, in which the primary priority valve is located in a module which is located between the pump side module and the proportional valve group.

6. A hydraulic control system according to claim 3, in which at least one module including a secondary priority valve is located in the proportional valve group.

* * * * *